(12) United States Patent
Rho et al.

(10) Patent No.: US 9,413,279 B2
(45) Date of Patent: Aug. 9, 2016

(54) APPARATUS AND METHOD FOR CONTROLLING MOTOR

(71) Applicant: Hyundai Motor Company, Seoul (KR)

(72) Inventors: Jeong Won Rho, Seoul (KR); Young Un Kim, Gyeonggi-do (KR); Jae Sang Lim, Gyeonggi-do (KR); Kil Young Youn, Gyeonggi-do (KR); Ji Wan Cha, Incheon (KR); Seong Min M. Kim, Gyeongsangnam-do (KR); Jin Ho Kim, Gyeonggi-do (KR); Gu Bae Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 86 days.

(21) Appl. No.: 14/565,720

(22) Filed: Dec. 10, 2014

(65) Prior Publication Data

US 2016/0087561 A1  Mar. 24, 2016

(30) Foreign Application Priority Data

Sep. 23, 2014 (KR) .......... 10-2014-0127123

(51) Int. Cl.
  *H02K 29/10* (2006.01)
  *H02P 6/16* (2016.01)
  *H02P 6/00* (2016.01)

(52) U.S. Cl.
  CPC . *H02P 6/16* (2013.01); *H02P 6/002* (2013.01)

(58) Field of Classification Search
  CPC .......... G11C 17/16; G11C 17/18; G11C 7/02; G11C 7/04; G11C 7/062; B60L 2240/425; B60L 2240/525; B60L 15/20; B60L 2240/423; B60L 2240/36; B60L 3/003; B60L 3/12; B60W 10/08; B60W 20/00; B60W 2510/00
  USPC ............. 318/400.04, 604, 605, 632, 634
  See application file for complete search history.

(56) References Cited

U.S. PATENT DOCUMENTS

| | | | | |
|---|---|---|---|---|
| 4,682,090 A | * | 7/1987 | Schmidt | G01D 5/243 318/636 |
| 4,712,106 A | * | 12/1987 | McNally | G08C 19/46 318/661 |
| 5,123,081 A | * | 6/1992 | Bachman | H02H 7/0852 318/472 |

(Continued)

FOREIGN PATENT DOCUMENTS

| | | |
|---|---|---|
| JP | 2010-188807 A | 9/2010 |
| KR | 10-1028024 B1 | 4/2011 |

(Continued)

*Primary Examiner* — Paul Ip
(74) *Attorney, Agent, or Firm* — Mintz Levin Cohn Ferris Glovsky and Popeo, P.C.; Peter F. Corless

(57) ABSTRACT

An apparatus and a method for controlling a motor are provided. The apparatus for controlling a motor includes a temperature sensor that is configured to detect a temperature of an inverter, and a variable amplifier that is configured to variably set an amplification gain that corresponds to the detected temperature of the inverter and amplify and output a resolver signal output from a resolver based on the variably set amplification gain, based on an excitation signal. A controller is then configured to estimate a position of a motor rotor based on the amplified resolver signal to calculate a flux angle and an excitation signal generator is configured to generate the excitation signal that corresponds to the calculated flux angle and output the generated excitation signal to the resolver.

12 Claims, 6 Drawing Sheets

(56) References Cited

U.S. PATENT DOCUMENTS

| | | | | |
|---|---|---|---|---|
| 5,231,351 A * | 7/1993 | Kordts | G01P 1/006 | 324/166 |
| 5,815,424 A * | 9/1998 | Kushihara | H03M 1/485 | 708/811 |
| 5,838,133 A * | 11/1998 | McCann | H02P 3/065 | 318/400.11 |
| 5,880,584 A * | 3/1999 | Arai | G01D 21/02 | 324/166 |
| 6,005,735 A * | 12/1999 | Gleim | G11B 15/026 | 340/584 |
| 6,462,615 B1 * | 10/2002 | Tanghe | H03F 3/45475 | 327/560 |
| 6,624,528 B2 * | 9/2003 | Shimizu | H02P 9/04 | 290/40 B |
| 6,639,810 B2 * | 10/2003 | Shimizu | H02P 9/305 | 363/16 |
| 7,012,420 B2 * | 3/2006 | Rodi | G01D 5/2448 | 324/207.12 |
| 7,353,094 B2 * | 4/2008 | Okoshi | B60K 6/445 | 180/65.1 |
| 7,755,310 B2 * | 7/2010 | West | B60L 3/00 | 318/400.02 |
| 7,755,948 B2 * | 7/2010 | Dudeck | G11C 7/02 | 365/185.25 |
| 7,816,881 B2 * | 10/2010 | Wiegers | H02P 6/16 | 318/560 |
| 7,839,108 B2 * | 11/2010 | Patel | H02H 7/0852 | 318/400.01 |
| 8,059,472 B2 * | 11/2011 | Dudeck | G11C 7/02 | 365/185.25 |
| 2002/0047271 A1 * | 4/2002 | Shimizu | H02P 9/02 | 290/40 C |
| 2003/0043604 A1 * | 3/2003 | Shimizu | H02P 9/305 | 363/37 |
| 2004/0140793 A1 * | 7/2004 | Rodi | G01D 5/2448 | 324/76.77 |
| 2004/0249518 A1 * | 12/2004 | Okoshi | B60K 6/445 | 701/1 |
| 2008/0012522 A1 * | 1/2008 | Wiegers | H02P 6/16 | 318/638 |
| 2008/0111506 A1 * | 5/2008 | Muta | B60K 6/365 | 318/15 |
| 2009/0066281 A1 * | 3/2009 | West | B60L 3/00 | 318/434 |
| 2009/0189561 A1 * | 7/2009 | Patel | H02H 7/0852 | 318/806 |
| 2010/0045103 A1 * | 2/2010 | Mitsutani | B60L 3/12 | 307/9.1 |
| 2010/0046291 A1 * | 2/2010 | Dudeck | G11C 7/02 | 365/185.05 |
| 2011/0080124 A1 * | 4/2011 | Sasaki | H02M 7/48 | 318/400.3 |
| 2011/0089881 A1 * | 4/2011 | Shibuya | F04B 39/121 | 318/472 |
| 2011/0134959 A1 * | 6/2011 | Kim | G01K 7/25 | 374/144 |
| 2011/0222357 A1 * | 9/2011 | Dudeck | G11C 7/02 | 365/189.15 |
| 2012/0217795 A1 * | 8/2012 | Hasegawa | B60L 3/003 | 307/9.1 |
| 2013/0147407 A1 * | 6/2013 | Kawamura | H02P 29/0088 | 318/400.21 |
| 2013/0249460 A1 * | 9/2013 | Sugahara | H02M 7/797 | 318/472 |

FOREIGN PATENT DOCUMENTS

| | | |
|---|---|---|
| KR | 2011-0048979 A | 5/2011 |
| KR | 2012-0067204 A | 6/2012 |
| KR | 10-1335162 B1 | 12/2013 |

* cited by examiner

APPARATUS AND METHOD FOR CONTROLLING MOTOR

CROSS-REFERENCE TO RELATED APPLICATION

This application is based on and claims the benefit of priority to Korean Patent Application No. 10-2014-0127123, filed on Sep. 23, 2014 in the Korean Intellectual Property Office, the disclosure of which is incorporated herein in its entirety by reference.

TECHNICAL FIELD

The present disclosure relates to a method and an apparatus for controlling a motor, and more particularly, to a technology of controlling a motor based on a position of a rotor by reflecting a temperature of an inverter.

BACKGROUND

An apparatus for controlling a motor using an inverter operates a motor by measuring a flux and using the measured flux or by detecting or estimating a position or a speed of a rotor of the motor and using the detected or estimated position or speed. Generally, a method of measuring the position and speed of the motor is classified into a method using an analog sensor and a method using a digital sensor. The analog method based measurement apparatus is a synchro, a resolver, a taco-generator, or the like and is configured to measure a position based on a displacement amount of the rotor converted into an analog amount.

Further, in a blush-less DC (BLDC) motor, the position of the rotor is required to be determined to implement functions of a commutator and a brush as a power semiconductor switch. The rotor is configured as a permanent magnet, and therefore the position of the rotor is searched using a flux detection sensor such as a hall element. In a method using the resolver, the resolver generally outputs a sensed electrical angle of the motor to a resolver digital converter (RDC) as a signal form, in which the RDC detects the position of the rotor of the motor and outputs the detected signal to a controller. However, when the temperature of the inverter rises, a magnitude of the signal applied to the resolver is amplified. In particular, a magnitude of a signal output from the resolver is also increased. When the signal from the resolver is amplified to a fixed gain, the output signal may be excessive or insufficient, such that a signal to noise ratio may be reduced.

SUMMARY

The present invention provides an apparatus for controlling a motor determining an error or a fault of a position detection sensor such as a resolver and providing the error or the fault, an electric vehicle including the same, and a method for controlling a motor thereof Another aspect of the present invention provides an apparatus for controlling a motor capable of more precisely performing a control of a motor by operating an inverter using position information of the motor when a position detection sensor does not have an error or a fault, an electric vehicle including the same, and a method for controlling a motor thereof.

According to an exemplary embodiment of the present invention, an apparatus for controlling a motor may include a temperature sensor configured to detect a temperature of an inverter; a variable amplifier configured to variably set an amplification gain that corresponds to the detected temperature of the inverter and amplify and output a resolver signal output from a resolver based on the variably set amplification gain, based on an excitation signal; a controller configured to estimate a position of a motor rotor based on the amplified resolver signal to calculate a flux angle; and an excitation signal generator configured to generate the excitation signal that corresponds to the calculated flux angle and output the generated excitation signal to the resolver.

According to another exemplary embodiment of the present invention, a method for controlling a motor may include detecting a temperature of an inverter; variably setting an amplification gain that corresponds to the detected temperature of the inverter; amplifying and outputting a resolver signal output from a resolver based on the variably set amplification gain, corresponding to an excitation signal generated from an excitation signal generator; estimating a position of a motor rotor based on the amplified resolver signal to calculate a flux angle; and generating the excitation signal that corresponds to the calculated flux angle and outputting the generated excitation signal to the resolver.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
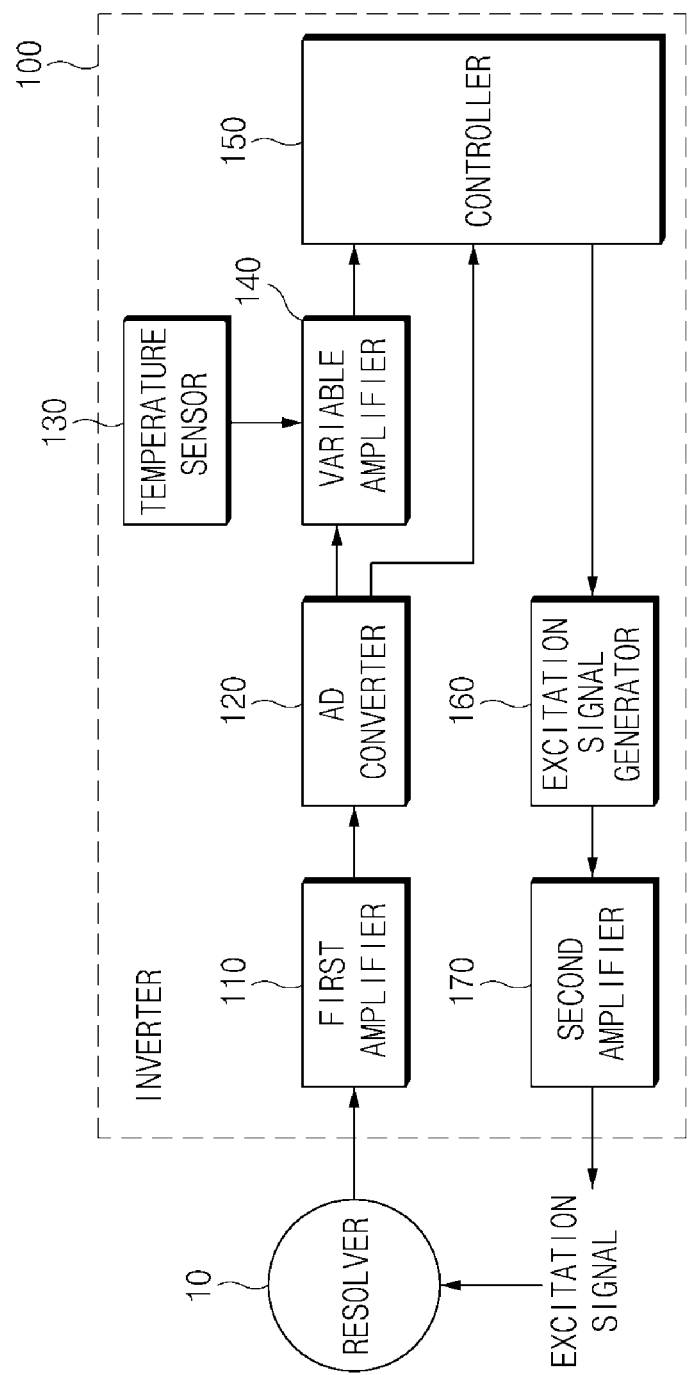
FIG. 1 is an exemplary block diagram showing a configuration of an apparatus for controlling a motor according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is to be noted that technical terms used in the specification are used for describing specific embodiments and do not limit the present invention. In addition, unless indicated otherwise in the specification, it is to be understood that all the technical terms used in the specification are not construed as meaning as those that are generally understood by those skilled in the art and as excessively comprehensive meanings or excessively reduced meanings. In addition, when the technical terms used in the specification are wrongly technical terms that do not accurately indicate the technical spirit of the present invention, it is to be understood that the terms are replaced with the technical terms understood by those skilled in the art. Further, the general terms used in the present invention must be understood according to the terms defined by the dictionary or the context and should not be excessively reduced meanings The terms are only used to differentiate one component from other components. For example, the 'first' component may be named the 'second' component and the 'second' component may also be similarly named the 'first' component, without departing from the scope of the present invention.

Hereinafter, exemplary embodiments of the present invention will be described in detail with reference to the accompanying drawings, but like reference numerals refer to like components and overlapping descriptions thereof will be omitted. In addition, when it is determined that the detailed description of the known art related to the present invention may obscure the gist of the present invention, the detailed description thereof will be omitted. In addition, it should be noted that the accompanying drawings are only for the convenience of illustration and description of the present invention, but are not construed to limit the spirit of the present invention.

FIG. 1 is an exemplary block diagram showing a configuration of an apparatus for controlling a motor according to an exemplary embodiment of the present invention. In an electric vehicle according to an exemplary embodiment of the present invention, an inverter 100 may be configured to convert direct current (DC) power supplied from a battery into alternating current (AC) power, which may be supplied to a motor. In particular, the inverter 100 may be configured to apply a driving current to the motor using a control signal, that is, a motor driving signal generated from the apparatus for controlling a motor based on a position of a rotor.

The apparatus for controlling a motor may use an algorithm for varying an amplification gain based on a temperature of an inverter to substantially constantly maintain a gain of a signal input to calculate the position of the rotor. In particular, a magnitude of a resolver signal may be changed based on a change in the temperature of the inverter 100 to prevent a signal to noise ratio from reducing due to overflow during amplification of the signal or a reduction in the signal. The apparatus for controlling a motor may be implemented in the inverter 100 and may also be implemented extraneous to the inverter to be connected to the inverter 100 to transmit and receive a signal. FIG. 1 illustrates an example in which the apparatus for controlling a motor is implemented within the inverter 100.

Meanwhile, the motor may include a stator fixed without being rotated and a rotating rotor and may be configured to generate a rotating force by receiving AC power supplied from the inverter 100. When the AC power output from the inverter 100 is applied to the motor, the stator of the motor may be applied with the AC power to generate a magnetic field. When the motor includes a permanent magnet, the magnetic field generated from the stator and the magnetic field from the permanent magnet included in the rotor may be repulsive from each other to rotate the rotor. The rotating force may be generated by the rotation of the rotor.

In particular, the rotating force generated by the motor may be applied to a front wheel and/or a rear wheel of the electric vehicle to move the electric vehicle. A resolver 10 may be used to measure the position of the rotor. When an excitation signal from the inverter 100, for example, an excitation voltage Vr which becomes a signal in a sine wave form of about 10 kHz and 5 Vpp is applied to an excitation winding of the resolver 10, an excitation current may flow in the excitation winding of the resolver 10 and a flux may be generated at an air gap between the rotor and the stator of the resolver 10. In particular, as the rotor of the motor is rotated, the rotor of the resolver 10 may rotate and output signals of V1 and V2 may be generated from a sine winding and a cosine winding of the resolver 10, respectively.

Resolver signals of the sine component and the cosine component output from the resolver 10 may be applied to the inverter 100, which may be used to estimate the position of the rotor of the resolver 10 in the apparatus for controlling a motor. Therefore, as illustrated in FIG. 1, the apparatus for controlling a motor according to the exemplary embodiment of the present invention may include a first amplifier 110, a second amplifier 170, and AD (analog-to-digital) converter 120, a temperature sensor 130, a variable amplifier 140, a controller 150, and an excitation signal generator 160.

First, the first amplifier 110 may be disposed between an output terminal of the resolver 10 and an input terminal of the AD converter 120. The first amplifier 110 may be configured to amplify the resolver signal output from the resolver 10 based on a previously defined gain and output the amplified resolver signal to the AD converter 120. In particular, the resolver signal may include a first signal of a sine component and a second signal of a cosine component, and the first amplifier 110 may include an amplifier configured to amplify the gains of the first signal and the second signal output from the resolver 10 and a differential amplifier configured to amplify a differential signal of the first signal and the second signal.

Meanwhile, the second amplifier 170 may be disposed between an output terminal of the excitation signal generator 160 and an input terminal of the resolver 10. In particular, the second amplifier 170 may be configured to output a square wave signal output from the excitation signal generator 160 in a sine wave signal form, which may be applied to the resolver 10. The first amplifier 110 and the second amplifier 170 may be implemented on a substrate within the inverter 100 in a hardware form, for example, a chip form or a module form, but is not limited thereto.

The AD converter 120 may be configured to convert the resolver signals in an analog form amplified by the first amplifier 110 into digital signals and apply the digital signals to the variable amplifier 140. Further, the temperature sensor 130 may be disposed within the inverter 100 to detect a temperature of the inverter 100. In particular, the temperature sensor 130 may be configured to transmit the detected temperature of the inverter to the variable amplifier 140. The variable amplifier 140 may be configured to variably set the amplification gain. In particular, the variable amplifier 140 may be configured to variably set the amplification gain that corresponds to the temperature of the inverter detected by the temperature sensor 130. The variable amplifier 140 may include a matching table in which amplification gains for each temperature of the inverter may be recorded or stored and when the temperature of the inverter detected by the temperature sensor 130 is input, the amplification gain that corresponds to the input temperature of the inverter may be detected in the matching table and thus may be variably set as the amplification gain of the variable amplifier 140.

When the amplification gain of the variable amplifier 140 is variably set based on the temperature of the inverter, the variable amplifier 140 may be configured to amplify the resolver signal input from the AD converter 120 based on the variably set amplification gain and output the amplified resolver signal to the controller 150. Particularly, since the variable amplifier 140 may be configured to variably set the amplification gain based on the temperature of the inverter, a signal within a predetermined range may be applied to the controller 150 even though a magnitude of the resolver signal is increased by the increase of the temperature of the inverter. The variable amplifier 140 may be implemented in a software module form to variably amplify the resolver signal in a software form.

Furthermore, the controller 150 may be configured to diagnose a fault of the resolver 10 from the resolver signal. In particular, the controller 150 may be configured to diagnose normality when a signal value of the resolver corresponds to a predefined reference value and diagnose a fault when the signal value of the resolver deviates from a predefined reference value for a set period of time. Additionally, the controller 150 may be configured to estimate the position of the rotor from the resolver signal amplified by the variable amplifier 140 to calculate a flux angle. In other words, the controller 150 may be configured to estimate the position of the rotor based on the sine component and the cosine component of the resolver signal as an input value and calculate the flux angle based on the estimated position of the rotor. The controller 150 may be configured to measure amplitudes of the resolver signals, for example, the first signal of the sine component and the second signal of the cosine component, respectively and use a value of a lissajous radius for a circular lissajous waveform obtained from the measured amplitudes to correct or adjust an angle detection error of the resolver 10. The flux angle information calculated and adjusted by the controller 150 may be applied to the excitation signal generator 160.

Therefore, the excitation signal generator 160 may be configured to generate the excitation signal based on the position of the rotor from the flux angle information of the resolver 10 input from the controller 150 and output the generated excitation signal to the second amplifier 170. In particular, the output excitation signal may be amplified by the second amplifier 170, which may be output to the resolver 10. Therefore, the resolver 10 may be driven or operated using the excitation signal as an input signal and detect the position of the rotor of the motor.

Figure 2:
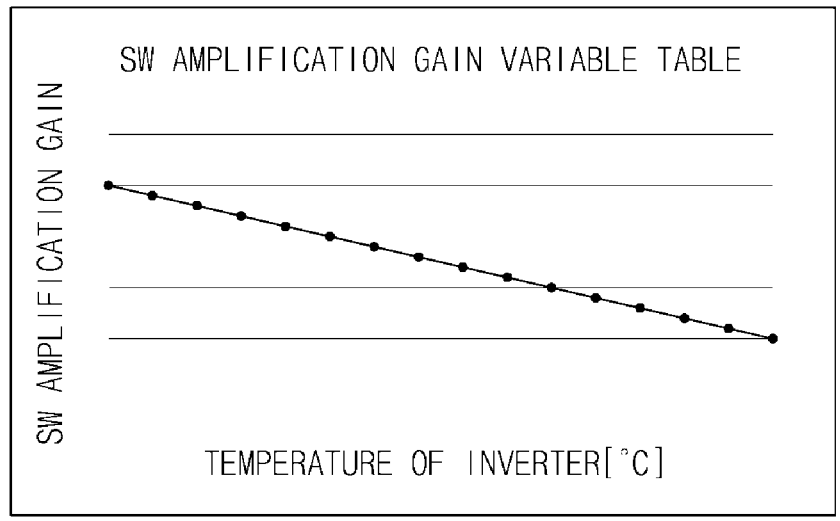
FIG. 2 is an exemplary diagram illustrating a matching table applied to the apparatus for controlling a motor according to the exemplary embodiment of the present invention.

FIG. 2 is an exemplary diagram illustrating a matching table applied to the apparatus for controlling a motor according to the exemplary embodiment of the present invention. The apparatus for controlling a motor may be configured to vary the amplification gain based on the temperature of the inverter by applying the variable table for the amplification gain to the variable amplifier, to cause the output signal of the variable amplifier to maintain a magnitude within a predetermined range. In particular, as illustrated in FIG. 2, in the matching table, when the temperature of the inverter is a reference temperature T, the amplification gain may become a reference gain $\alpha$. Meanwhile, when the temperature of the inverter is increased by $\Delta T$ from the reference temperature T and becomes T2, the amplification gain may become $\beta$ less than the reference gain $\alpha$.

Accordingly, when the inverter temperature becomes T2 and is increased to be greater than the reference temperature, the magnitude of the excitation signal may also be increased and when the magnitude of the excitation signal is increased, the magnitude of the resolver signal may also be increased. Therefore, the apparatus for controlling a motor may be configured to adjust the amplification gain of the variable amplifier to be reduced to $\beta$ based on the matching table and thus may prevent the magnitude of the excitation signal from increasing even when the temperature of the inverter is increased. Further, even when the temperature of the inverter decreases to be less than the reference, even though the temperature of the inverter decreases, it may be possible to prevent the magnitude of the excitation signal from reducing by increasing the amplification gain.

Figure 3:
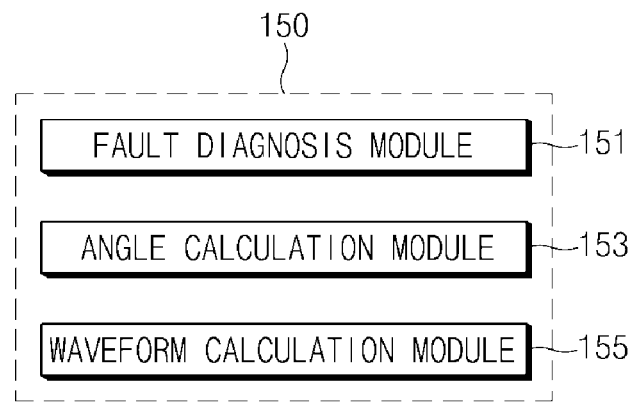
FIG. 3 is an exemplary block diagram illustrating a configuration of a controller of FIG. 1 according to an exemplary embodiment of the present invention.

FIG. 3 is an exemplary block diagram illustrating a configuration of a controller of FIG. 1. Referring to FIG. 3, the controller 150 may include a fault diagnostic module, an angle calculation module, and a lissajous calculation module.

The fault diagnostic module may be configured to diagnose or detect the fault (e.g., a failure) of the resolver from the resolver signal. In particular, the fault diagnostic module may be configured to detect normality (e.g., a no failure state) when the signal value of the resolver corresponds to the predefined reference value and detect a failure when the signal value of the resolver deviates from the predefined reference value for a set period of time. The angle calculation module may be configured to estimate the position of the rotor from the resolver signal amplified by the variable amplifier to calculate the flux angle. In particular, the angle calculation module may be configured to estimate the position of the rotor based on the sine component and the cosine component of the resolver signal as the input value and calculate the flux angle based on the estimated position of the rotor.

The lissajous calculation module may be configured to calculate a value of a lissajous radius for a circular lissajous waveform based on an amplitude of the resolver signal. Particularly, the controller 150 may be configured to measure the amplitudes of the resolver signals, for example, the first signal of the sine component and the second signal of the cosine component, respectively and use the value of the lissajous radius for the circular lissajous waveform obtained from the measured amplitudes to calculate a compensation value for the angle detection error of the resolver 10. Therefore, the apparatus for controlling a motor may be configured to correct the error of the flux angle calculated by the angle calculation module based on the compensation value calculated by the lissajous calculation module and generate the excitation signal based on the error correction and apply the generated excitation signal to the resolver.

Figure 4:
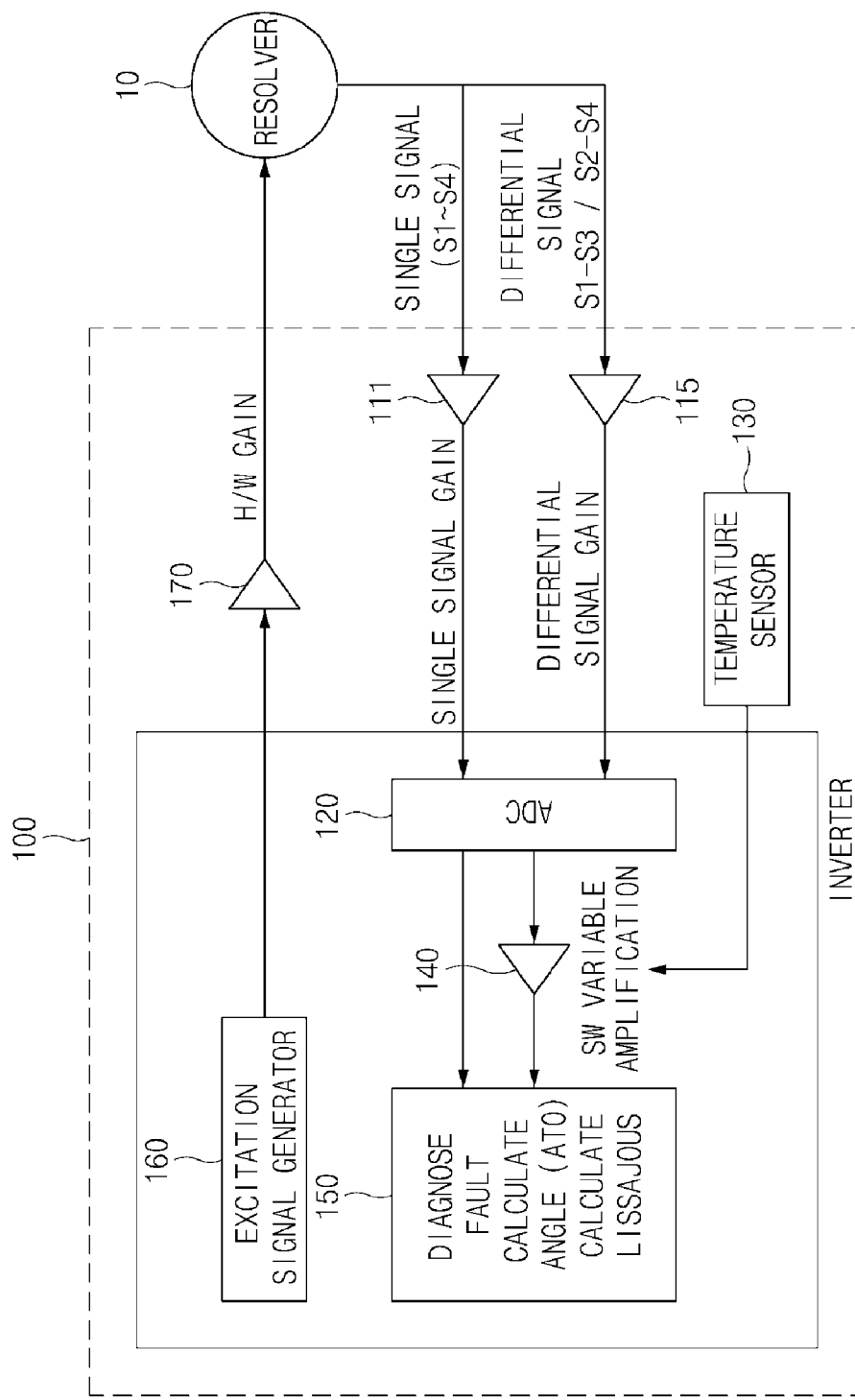
FIG. 4 is an exemplary diagram illustrating a signal flow of the apparatus for controlling a motor according to the exemplary embodiment of the present invention.

FIG. 4 is an exemplary diagram illustrating a signal flow of the apparatus for controlling a motor according to the exemplary embodiment of the present invention. Referring to FIG. 4, in the apparatus for controlling a motor, when the excitation signal is output from the excitation signal generator 160 to the second amplifier 170, the second amplifier 170 may be configured to amplify the excitations signal by a defined gain and output the amplified excitation signal to the resolver 10.

Particularly, the resolver 10 may be driven based on the excitation signal to detect the position of the motor rotor and may be configured to output the resolver signal that corresponds thereto to the first amplifier 110 of the apparatus to operate a motor. The resolver signal may be output as signals S1 and S3 having a cosine component and signals S2 and S4 having a sine component, respectively. In addition, single signals of S1, S2, S3, and S4 may be applied to the amplifier 111 and thus may be amplified based on a predefined gain, differential signals between the S1 and S3 and the S2 and S4 may be applied to the differential amplifier 115 and thus may be amplified based on the predefined gain, and the amplified single signals and differential signals may be applied to the AD converter 120 and thus may be converted into the digital signals.

The digital signal converted by the AD converter 120 may be amplified based on the amplification gain variably set by the variable amplifier 140 and then may be output to the controller 150. The variable amplifier 140 may be configured to apply and amplify the corresponding variable gain based on the temperature of the inverter detected by the inverter temperature sensor 130. Therefore, the controller 150 may be configured to perform the fault diagnosis, the angle calculation, and the lissajous calculation from the input signal and apply the result to the excitation signal generator 160 to generate and reflect the excitation signal. The apparatus for controlling a motor may be configured to transfer a signal based on the foregoing flow and use the position of the rotor detected by the resolver 10 to operate the motor. The AD converter 120, the variable amplifier 140, the controller 150, and the excitation signal generator 160 may be implemented in a CPU module of the inverter 100.

Figure 5:
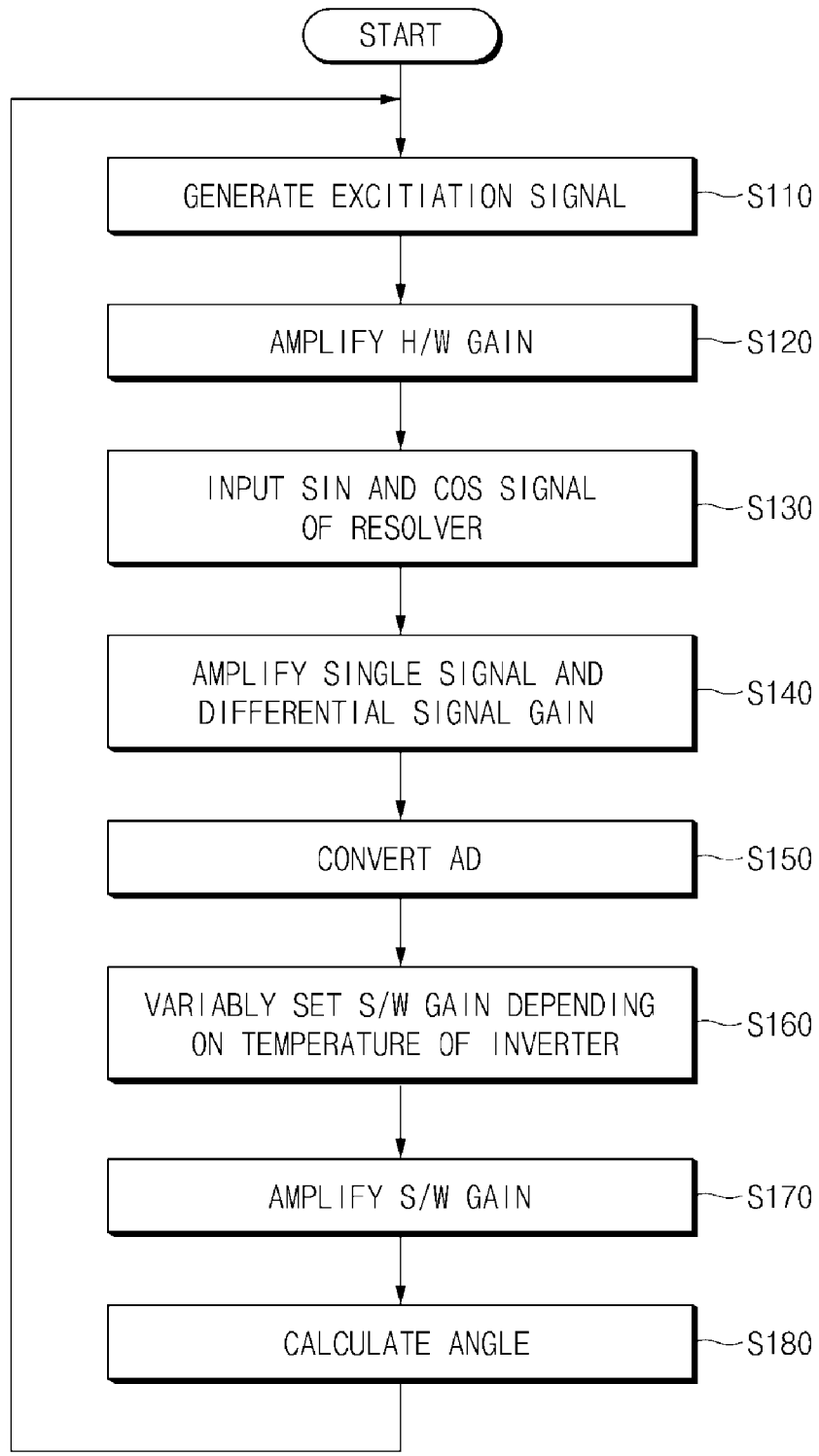
FIG. 5 is an exemplary flow chart illustrating an operation flow of a method for controlling a motor according to an exemplary embodiment of the present invention.

An operation flow of the apparatus for controlling a motor according to the exemplary embodiment of the present invention configured as described above will be described below in detail. FIG. 5 is an exemplary flow chart illustrating an operation flow of a method for controlling a motor according to an exemplary embodiment of the present invention. Referring to FIG. 5, the apparatus for controlling a motor may be configured to generate the excitation signal for driving the resolver (S110). In particular, the excitation signal generated in step 'S110' may have a gain amplified in a hardware form and may be applied to the resolver (S120).

When the resolver signal having the sine and cosine components is input from the resolver (S130), the apparatus for controlling a motor may be configured to amplify the gains of the single signals and the differential signals of the resolver signal and convert the analog signal into the digital signal by the AD converter (S150).

In step 'S150', the resolver signal converted into the digital signal may have a gain amplified in a software form by the variable amplifier and then may be applied to the controller. The variable amplifier may be configured to variably set the software amplification gain based on the inverter temperature (S160) and in step 'S160', the input resolver signal may be amplified based on the set gain (S170).

Figure 6:
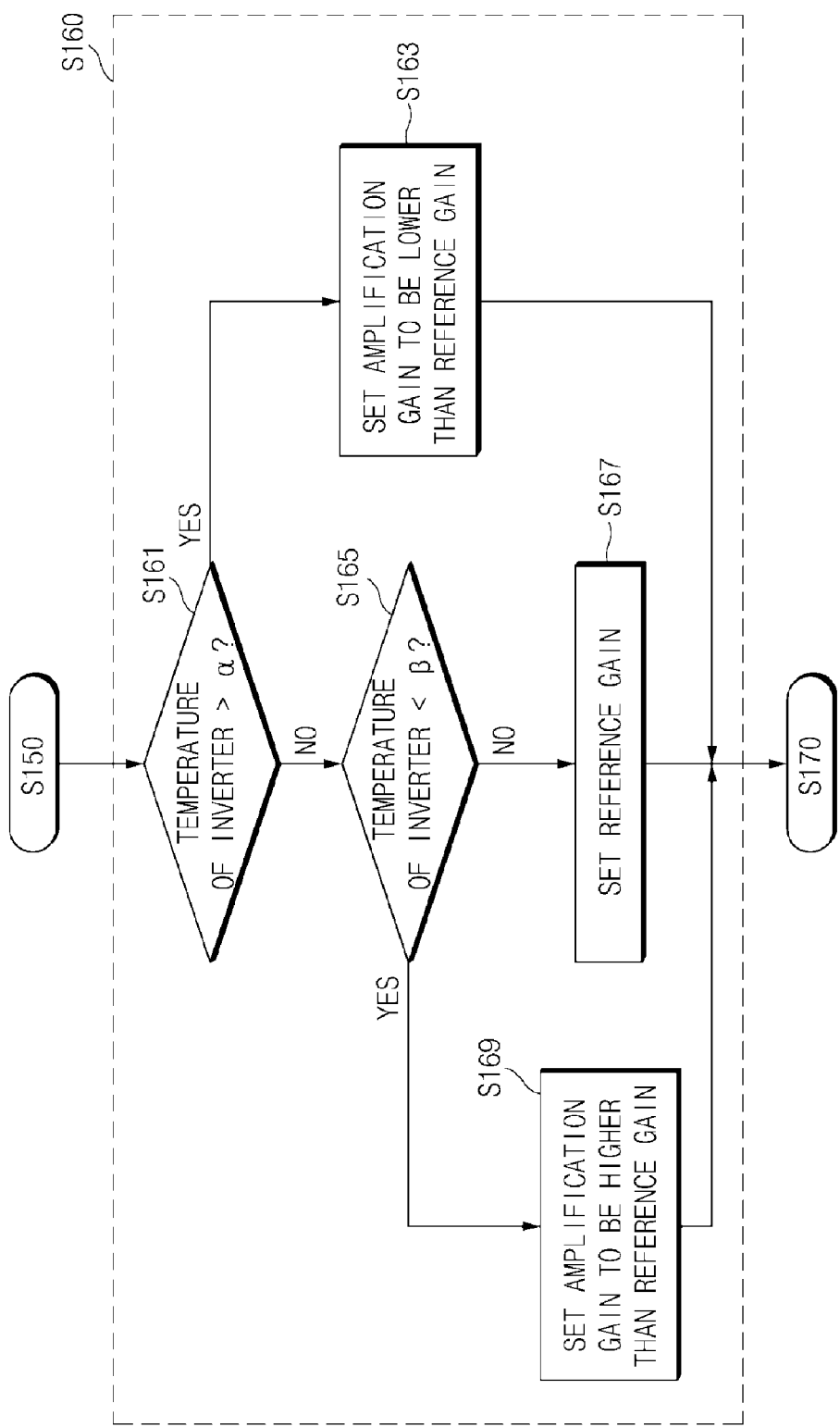
FIG. 6 is an exemplary flow chart illustrating an operation flow of variably setting an amplification gain of the method for controlling a motor according to an exemplary embodiment of the present invention.

In step 'S160', the process of variably setting the amplification gain will be described with reference to FIG. 6. As illustrated in FIG. 6, the apparatus for controlling a motor may be configured to determine whether the temperature of the inverter is greater than the reference temperature and in response to determining that the temperature of the inverter is greater than the upper reference temperature (S161), set the amplification gain to be less than the reference gain (S163).

Meanwhile, the apparatus for controlling a motor may be configured to set the amplification gain to be the reference gain when the temperature of the inverter is equal to or less than the upper reference temperature (S161) and is equal to or greater than the lower reference temperature (S165) (S167). Meanwhile, the apparatus for controlling a motor may be configured to set the amplification gain to be increased, when the temperature of the inverter is less than the lower reference temperature (S169). Further, the apparatus for controlling a motor may use the resolver signal amplified in step 'S170' to estimate the position of the rotor and may be configured to calculate the flux angle (S180), used to generate the excitation signal. The steps 'S110' to 'S180' may be repeatedly performed during the operation of the motor.

The processes may be directly implemented by a hardware module and a software module which are executed by a processor, or a combination thereof. The software module may reside in a storage medium such as an RAM memory, a flash memory, an ROM memory, an EPROM memory, an EEPROM memory, a register, a hard disk, a detachable disk, and a CD-ROM, that is, a memory and/or a storage. The exemplified storage medium is coupled with the processor which may read information from the storage media and write the information in the storage medium. As another method, the storage medium may be integrated with the processor. The processor and the storage medium may reside in an application specific integrated circuit (ASIC). The ASIC may reside in a user terminal. As another method, the processor and the storage medium may reside in the user terminal as an individual component.

As described above, according to the apparatus for controlling a motor and the electric vehicle including the same in accordance with the exemplary embodiments of the present invention, it may be possible to determine the error or the fault of the position detection sensor such as the resolver configured to sense the position of the motor using the simplified algorithm and inform the user of the determined error or fault to improve the safety of the system and the user convenience. Further, according to the exemplary embodiment of the present invention, it may be possible to improve the safety of the system and increase the efficiency by more precisely performing the control of the motor by operating the inverter using the position information of the motor when the position detection sensor does not have the error or the fault.

The specified matters and exemplary embodiments and drawings such as specific components of the present invention have been disclosed for illustrative purposes, but are not limited thereto, and those skilled in the art will appreciate that various modifications, additions and substitutions are possible from the invention in the art to which the present invention belongs. The spirit of the present invention is not defined by the foregoing exemplary embodiments, and all changes and modifications that fall within metes and bounds of the claims or equivalents of such metes and bounds are therefore intended to be embraced by the range of the spirit of the present invention.

What is claimed is:

1. An apparatus for controlling a motor, comprising:
a temperature sensor configured to detect a temperature of an inverter;
a variable amplifier configured to variably set an amplification gain that corresponds to the detected temperature of the inverter and amplify and output a resolver signal output from a resolver based on the variably set amplification gain, based on an excitation signal;
a controller configured to estimate a position of a motor rotor based on the amplified resolver signal to calculate a flux angle; and
an excitation signal generator configured to generate the excitation signal that corresponds to the calculated flux angle and output the generated excitation signal to the resolver.

2. The apparatus according to claim 1, wherein the variable amplifier is configured to set the amplification gain that corresponds to the detected temperature of the inverter using a matching table in which amplification gains for each temperature of the inverter are recorded.

3. The apparatus according to claim 1, wherein the resolver signal includes a first signal of a sine component and a second signal of a cosine component.

4. The apparatus according to claim 1, wherein the variable amplifier is implemented as a software module.

5. The apparatus according to claim 1, wherein a matching table shows that as the temperature of the inverter increases to greater than a reference temperature, the amplification gain is reduced and the temperature of the inverter decreases to less than the reference temperature, the amplification gain is increased.

6. The apparatus according to claim 1, wherein the controller is further configured to:
diagnose a fault of the resolver from the resolver signal;
estimate the position of the rotor and calculate the flux angle based on a sine component and a cosine component of the resolver signal as an input value; and
calculate a value of a lissajous radius for a circular lissajous waveform based on an amplitude of the resolver signal to calculate a compensation value for an angle detection error of the resolver.

7. The apparatus according to claim 1, further comprising:
a first amplifier configured to be connected to an output terminal of the resolver and an input terminal of an AD converter to amplify the resolver signal; and
a second amplifier configured to be connected to an output terminal of the excitation signal generator and an input terminal of the resolver to amplify a square wave signal output by the excitation signal generator and output the amplified square wave signal as a sine wave form.

8. A method for controlling a motor, comprising:
detecting, by a temperature sensor, a temperature of an inverter;
variably setting, by a variable amplifier, an amplification gain that corresponds to the detected temperature of the inverter;
amplifying and outputting, by the variable amplifier, a resolver signal output from a resolver based on the variably set amplification gain, corresponding to an excitation signal generated from an excitation signal generator;
estimating, by a controller, a position of a motor rotor based on the amplified resolver signal to calculate a flux angle; and
generating, by an excitation signal generator, the excitation signal that corresponds to the calculated flux angle and outputting the generated excitation signal to the resolver.

9. The method according to claim 8, wherein in the variably setting of the amplification gain, the amplification gain that corresponds to the detected temperature of the inverter is set using a matching table in which amplification gains for each temperature of the inverter are recorded.

10. The method according to claim 8, wherein the resolver signal includes a first signal of a sine component and a second signal of a cosine component.

11. The method according to claim 8, wherein in the amplifying and outputting of the resolver signal output from the resolver based on the variably set amplification gain, the amplification gain is adjusted to be less than a reference gain when the temperature of the inverter is greater than a reference temperature and the amplification gain is greater than the reference gain when the temperature of the inverter is less than the reference temperature.

12. The method according to claim 8, wherein the calculation of the flux angle includes:
estimating, by the controller, the position of the rotor and calculating the flux angle based on a sine component and a cosine component of the resolver signal as an input value; and
calculating, by the controller, a value of a lissajous radius for a circular lissajous waveform based on an amplitude of the resolver signal to calculate a compensation value for an angle detection error of the resolver and compensate for the calculated flux angle.

* * * * *